United States Patent
Givoly et al.

(10) Patent No.: US 7,966,221 B1
(45) Date of Patent: Jun. 21, 2011

(54) SYSTEM, METHOD AND COMPUTER PROGRAM PRODUCT FOR DYNAMIC PRICING

(75) Inventors: Tal Givoly, Cupertino, CA (US); Michael Sabbah, Shoham (IL); Nitsan Sharon, Ein Sarid (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 12/645,338

(22) Filed: Dec. 22, 2009

Related U.S. Application Data

(63) Continuation of application No. 11/179,432, filed on Jul. 11, 2005, now Pat. No. 7,640,192.

(60) Provisional application No. 60/692,053, filed on Jun. 16, 2005.

(51) Int. Cl.
*G06Q 30/00* (2006.01)

(52) U.S. Cl. ......................................................... 705/26

(58) Field of Classification Search .................... 705/26, 705/27
See application file for complete search history.

(56) References Cited

U.S. PATENT DOCUMENTS

| | | |
|---|---|---|
| 2002/0095327 A1 | 7/2002 | Zumel et al. |
| 2002/0116348 A1 | 8/2002 | Phillips et al. |
| 2002/0133451 A1 | 9/2002 | Wang et al. |
| 2003/0023567 A1 | 1/2003 | Berkovitz et al. |
| 2004/0132449 A1 | 7/2004 | Kowarsch |
| 2004/0172373 A1 | 9/2004 | Chen |
| 2004/0243492 A1* | 12/2004 | Korisch ........................ 705/35 |
| 2004/0243505 A1 | 12/2004 | Sweeting et al. |
| 2005/0010457 A1* | 1/2005 | Ettinger ......................... 705/7 |
| 2005/0108141 A1* | 5/2005 | Farrell et al. ................. 705/37 |
| 2006/0277109 A1* | 12/2006 | Kerth et al. ................... 705/20 |

FOREIGN PATENT DOCUMENTS

WO 0154017 A1 7/2001

OTHER PUBLICATIONS

Peterson Robert, The University of Texas at Austin, Dissertation, DAI-A 66/05, p. 1861, Nov. 2005 http://proquest.umi.com/pqdweb?did=921046511&sid=3&Fmt=2&clientId=19649&RQT=309&VName=PQD.*
Lemieux, J. M., A Dynamic Model of Asymmetric Price Negotiation, Dissertation, DAI-A 66/05, p. 1861, Nov. 2005, http://proquest.umi.com/pqdlink?Ver=1&Exp=01-24-2016&FMT=7&DID=921046511&RQT=309&attempt=1, (Abstract).
Notice of Allowance from U.S. Appl. No. 11/179,432, dated Sep. 30, 2009.
Non-Final Office Action from U.S. Appl. No. 11/179,432, dated Mar. 11, 2009.

* cited by examiner

*Primary Examiner* — Mila Airapetian
(74) *Attorney, Agent, or Firm* — Zilka-Kotab, PC

(57) ABSTRACT

A system, method and computer program product are provided for various pricing techniques. Initially, data associated with a sale of goods or services may be received. A plurality of values associated with the sale of goods or services may then be calculated based on the received data. At least one of the values is then optionally compared to a low threshold and at least one of the values is also optionally compared to a high threshold, although any threshold may be used. Even still, the threshold may be altered based on the received data. Consequently, the price of the goods or services may also be altered based on the comparisons, wherein the price may be altered, at least in part, in a random manner. Further, the altered price may be output.

20 Claims, 20 Drawing Sheets

FIGURE 14.1

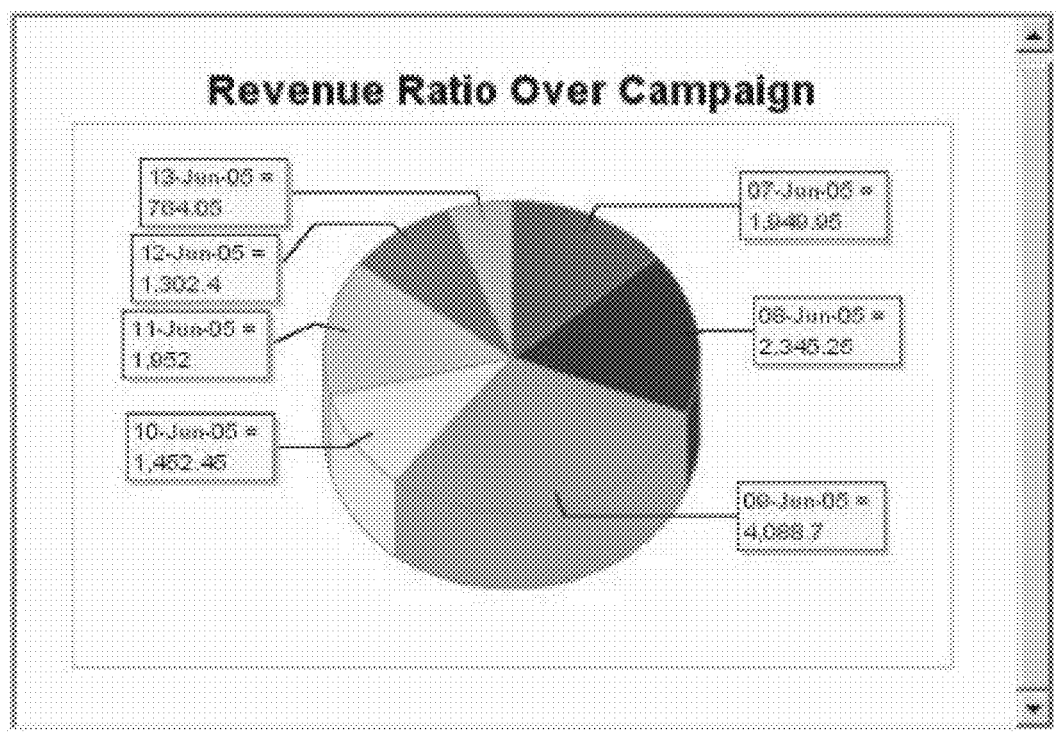
FIGURE 14.2

FIGURE 14.3

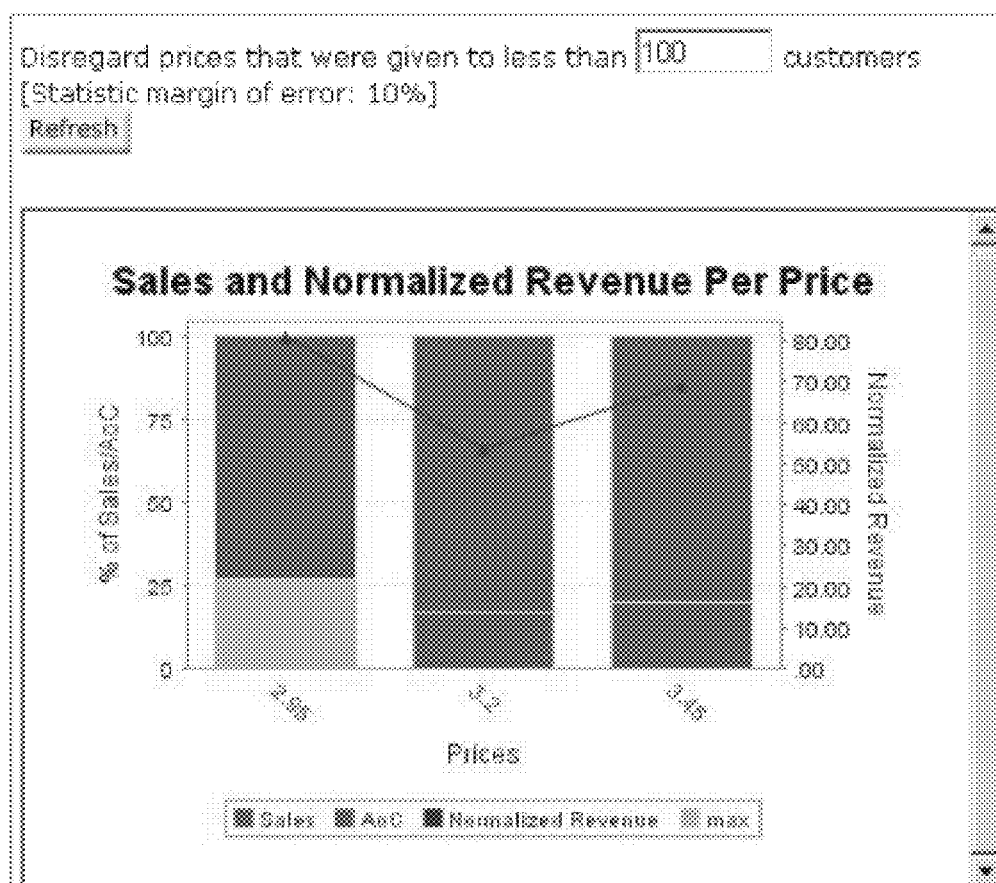
FIGURE 14.4

SYSTEM, METHOD AND COMPUTER PROGRAM PRODUCT FOR DYNAMIC PRICING

RELATED APPLICATION(S)

The present application is a continuation of U.S. application Ser. No. 11/179,432 filed Jul. 11, 2005, now U.S. Pat. No. 7,640,192 which, in turn, claims priority of U.S. Provisional Application No. 60/692,053 filed Jun. 16, 2005, both of which are incorporated herein by reference in their entirety for all purposes.

FIELD AND BACKGROUND OF THE INVENTION

The present invention relates to software, and more particularly, to business management software.

Traditionally, the sale of goods and/or services is accomplished by setting a static price for the good and/or service. Generally, the static price is a value pre-defined by the seller and stored in a database. This value then becomes the fixed price of the good and/or service. Thus, when a buyer decides to purchase the good and/or service, the buyer pays the fixed price. Static prices frequently result in reduced revenues for sellers since customers are often willing to pay more than the pre-defined value set by the seller. In addition, fixed pricing does not always accommodate the impact of an ever changing demand.

As a consequence of static pricing, the only way to increase or decrease the value, and thus change the static price, is for the seller to manually change the pre-defined value stored in the database. Sellers particularly have a goal of pricing a good and/or service in such a way that a maximum profit is made while still creating an attractive price to buyers. Manually changing a static price requires a seller to manually determine how to price the good and/or service properly such that the seller's goal is met.

Making a determination on a proper price can be very difficult, especially when the static price constantly needs to evolve in order to meet the seller's goal. Currently, sellers and marketing strategists make educated guesses with regard to setting pre-defined prices based on market surveys and statistics. Although such guesses are capable of meeting seller's goals, the likelihood that an accurate price will actually be guessed is low.

Another method for setting static prices is through market research. Market research analyzes market forces in determining an optimal price. However, market forces continuously change and thus require continuous modification of the static price. This in turn requires a manual change of the price according to the change in market forces, which can be extremely tedious. Another problem with using market research is that analyzing input associated with the market for determining the optimal price is extremely difficult to accomplish in real-time since multiple factors must be considered and weighed as a whole.

There is thus a need for overcoming these and/or other problems associated with the prior art.

SUMMARY

A system, method and computer program product are provided for various pricing techniques. Initially, data associated with a sale of goods or services may be received utilizing an input device. A plurality of values associated with the sale of goods or services may then be calculated based on the received data by utilizing a processor in communication with the input device. At least one of the values is then optionally compared to a low threshold and at least one of the values is also optionally compared to a high threshold by utilizing the processor. Consequently, the price of the goods or services may be altered based on the comparisons by utilizing the processor, and the altered price may further be output utilizing an output device in communication with the processor.

In another embodiment, an additional system, method and computer program product are provided for pricing in the following manner. Data associated with a sale of goods or services may be received utilizing an input device. A plurality of values associated with the sale of goods or services may then be calculated based on the received data utilizing a processor in communication with the input device. Optionally, at least one of the values is compared to a threshold utilizing the processor and the price of the goods or services may further be altered based on the comparison by using the processor. The altered price may still yet be output utilizing an output device in communication with the processor. In addition, the threshold may also be altered based on the received data.

In yet another embodiment, an additional system, method and computer program product are provided for pricing in the following manner. Initially, data associated with a sale of goods or services may be received utilizing an input device. A price of the goods or services may be altered based on the data utilizing a processor in communication with the input device. Further, the altered price may optionally be output utilizing an output device in communication with the processor. In addition, the price may be altered, at least in part, in a random manner.

DETAILED DESCRIPTION

Figure 1:
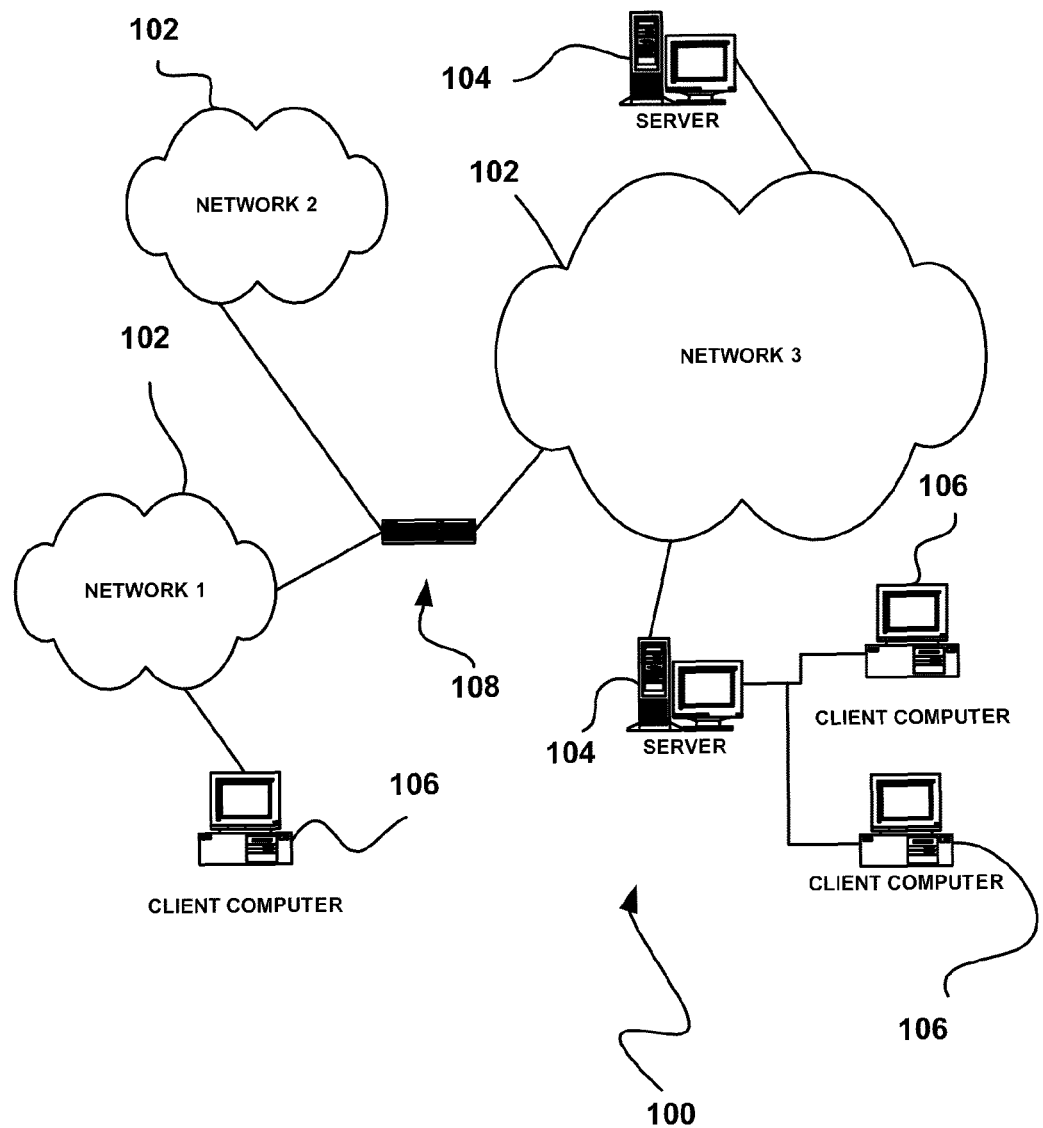
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), wireless network, wide area network (WAN) such as the Internet, etc.

Coupled to the networks 102 are server computers 104 which are capable of communicating over the networks 102. Also coupled to the networks 102 and the server computers 104 is a plurality of client computers 106. Such client computers 106 may each include a desktop computer, lap-top computer, hand-held computer, mobile phone, hand-held computer, and/or any other type of logic. In order to facilitate communication among the networks 102, at least one gateway or router 108 is optionally coupled therebetween.

Figure 2:
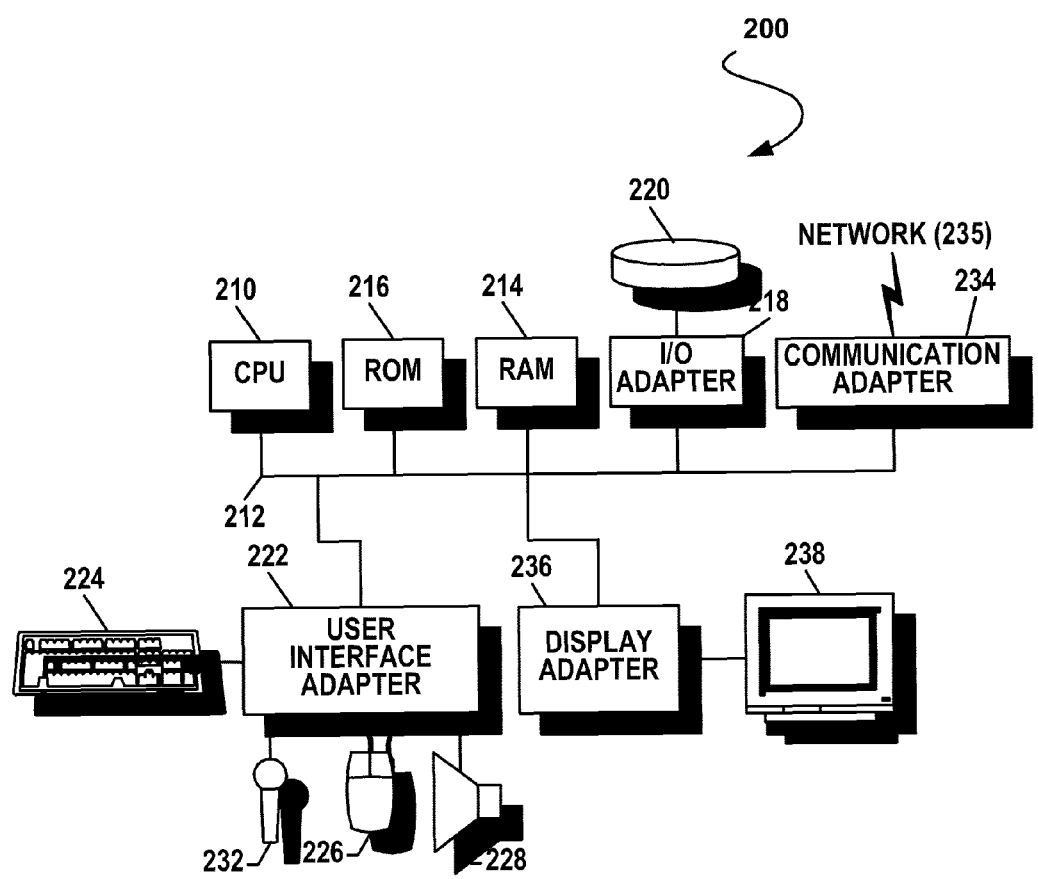
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a possible hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
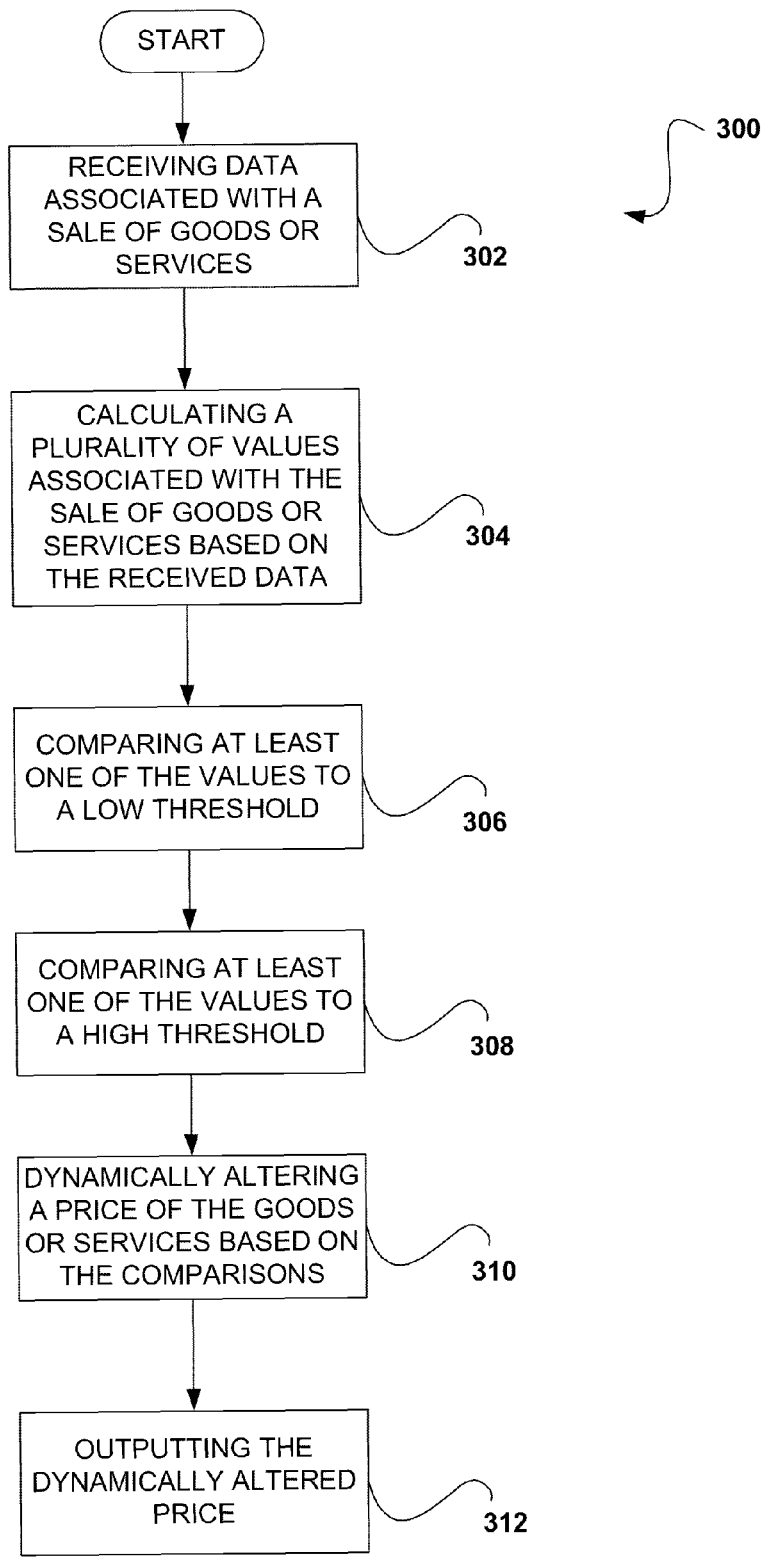
FIG. 3 shows a method for pricing, in accordance with one embodiment.

FIG. 3 shows a method 300 for pricing, in accordance with one embodiment. As an option, the method 300 may be implemented in the context of the architecture and environment of FIGS. 1 and/or 2. Of course, however, the method 300 may be carried out in any desired environment.

In one embodiment, the present method 300 may be used for dynamic pricing. In the context of one optional embodiment, such dynamic pricing may involve pricing goods and/or services according to policies, which allow for automated price adjustment during each sale. The policies may be associated with sales performance, environmental changes, and/or other factors that affect the calculation of an optimal price of a good and/or service. Such optimal price is one in which maximum revenues may be realized based on the value attributed to the good and/or service by customers, and which is optimal at the time of calculation and not necessarily for an entire sale period. In addition to determining the optimal price, dynamic pricing may be used to determine the optimal price in real-time such that the price attributed to a particular sale reflects the current optimal price.

Initially, in method 300, data that is associated with a sale of goods or services is received, as shown in operation 302. The data may be received in response to a request for a price of a good and/or service by a buyer. Further, such data may include a particular good or service the buyer is requesting to purchase (e.g. calling cards, prepaid phone calls, postpaid phone calls, physical goods, digital content such as ringtones, screensavers, games, etc.).

In addition, the data may include the number of buyers that have requested a price for the particular good and/or service, the number of goods and/or services purchased for a specific type, the number of goods and/or services purchased within a specific time period, the time passed between the request for a price and the actual purchase of the good and/or service, the time passed since the last purchase for a particular good and/or service, and/or any other data associated with the sale of goods or services that is capable of being received.

In addition, the data that is received in operation 302 may be received utilizing an input device (e.g. see, for example, various input devices in FIG. 2). For example, such input device may include a keyboard associated with a computer, a telephone, a network interface, and/or any other input device capable of allowing data to be received. Further, the data may, in one optional embodiment, be received into a database, or any other device capable of receiving the data, maintaining the data and/or providing the data upon request. As another option, the data may be extracted from messages sent to the dynamic pricing system. Examples of such messages may particularly include a request for a price, a request for purchase, etc.

Next, in operation 304, a plurality of values associated with the sale of goods or services is calculated based the data received in operation 302. The values which are calculated in operation 304 may include the sum of some or all goods sold within a predefined time period, the ratio between the number of actual purchases and the number of requests from buyers for a price within a predefined time period, and/or any other values associated with the sale of goods or services capable of being calculated based on the data received in operation 302. Additionally, the plurality of values that are calculated may simply include any combination of the data received in operation 302.

The plurality of values that are calculated in operation 304 may be calculated utilizing a processor (e.g. see, for example, various processors in FIGS. 1 and 2). Such a processor may include a computer that is capable of storing and implementing logic for calculating the plurality of values in operation 304, or any other device capable of storing and implementing logic for calculating the plurality of values in operation 304. In addition, the processor may optionally be in communication with the input device described with respect to operation 302.

In operation 306, at least one of the values calculated in operation 304 is compared to a first low threshold. In operation 308, at least one of the values calculated in operation 304 is compared to a second high threshold. The first low threshold and second high threshold may both be predefined such that they are fixed values that may be manually changed.

Alternatively, the first low threshold and/or second high threshold may both be variable based on certain conditions, or they may even be random values. The low threshold and high threshold are values capable of being compared to at least one of the values calculated in operation 304. Further, the thresholds may create limits for ranges of values from operation 304, such that each range is associated with a particular rule for changing a price of the good and/or service to be purchased.

The comparisons of operations 306 and 308 may each be accomplished utilizing at least one processor. Such processor may be the processor as described with respect to operation 304, but of course may be any processor capable of carrying out the logic required to compare the values calculated in operation 304 with the first low threshold and/or second high threshold, as described with respect to operations 306 and 308.

Still yet, in operation 310, a price of the goods or services is altered based on the comparisons of operations 306 and 308. The price may be altered for an unlimited period of time or for a specified period of time. Certain predefined rules are utilized in determining how the price should be altered. For instance, the price may be altered according to a first rule if the at least one value calculated in operation 304 is determined to be less than the first low threshold during the comparison of operation 306. The first rule may include decreasing the price by a predetermined amount (e.g. either a fixed amount, percentage, etc.), but of course could include any rule associated with the price.

Further, the price may be altered according to a second rule if the at least one value is determined to be greater than the first low threshold during the comparison of operation 306, but less than the second high threshold during the comparison of operation 308. The second rule in such a case may simply state that the price is not to be altered, but is to instead stay the same value. Alternatively, the second rule could include any rule associated with the price.

Similarly, the price may be altered according to a third rule if the at least one value is determined to be greater than the second high threshold during the comparison of operation 308. As an example, the third rule may state that the price is to be increased by a predetermined amount (e.g. either a fixed amount, percentage, etc.), or the rule may include any other rule associated with the price. See Table 1 for an example of rules utilized with respect to operation 310.

TABLE 1

| RULE 1 | Value < LOW Threshold | Example: decrease price by predetermined amount |
| RULE 2 | LOW Threshold <Value <HIGH Threshold | Example: do not alter price |
| RULE 3 | HIGH Threshold <Value | Example: increase price by predetermined amount |

It should be noted that any combination of rules may be used with respect to operation 310, including using the same rule for any combination of the different conditions described above. Furthermore, the rules do not have to remain static, but can be edited and/or altered at any time, either manually or automatically. In addition, operation 310 may be carried out utilizing a processor. Such processor may further be the same processor used with respect to any or all of operations 304, 306 and/or 308, but of course may be any processor capable of carrying out the logic required to alter the price of the goods or services based on the comparisons of operation 306 and 308.

Furthermore, the altered price from operation 310 may be output in operation 312. Such output may include returning the price to the buyer and/or any other person interested in the altered price. For instance, the output may be in the form of a price a buyer can accept or reject, or in the form of a report, an example of which will be described in more detail with respect to the sale process monitoring module of FIG. 6.

Operation 312 may be accomplished utilizing an output device (e.g. see, for example, various input devices in FIG. 2). The output device may include a computer with a display, a telephone capable of presenting the price, or any other device capable of outputting the altered price of operation 310. Additionally, the output device may be in communication with the processor(s) utilized in operations 304-310.

As an option, when a buyer requests a price for a good and/or service, such as that which may be associated with operation 302, the buyer may first be required to accept certain terms of an agreement before a price is generated for the buyer. The terms may include, for example, a disclosure that the altered price, such as that with respect to operation 312, is only an individual price for that buyer specifically and that other buyers may receive different prices, that the altered price presented to the buyer is only valid for a certain period of time, that the buyer must accept the price in order to buy the good and/or service within that certain period of time, that if the price is accepted the buyer only has a limited period of time to actually purchase the good at that price, and/or any other terms associated with the presentation of a price to a buyer.

Figure 4:
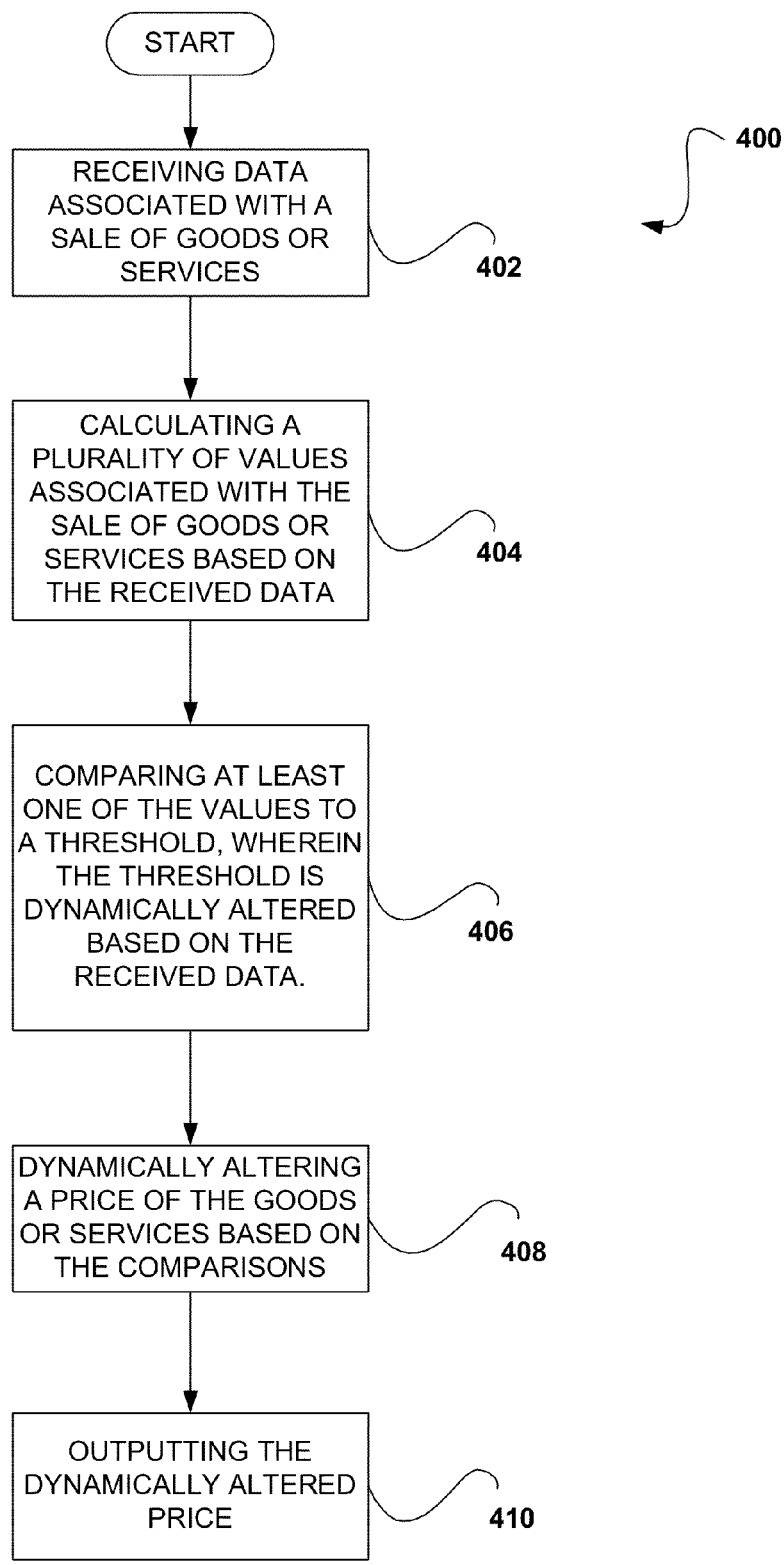
FIG. 4 shows a method for pricing, in accordance with another embodiment.

FIG. 4 shows a method 400 for pricing, in accordance with another embodiment. As an option, the method 400 may be implemented in the context of the architecture and environment of FIGS. 1-3 (with the same definitions applying herein). Of course, however, the method 400 may be carried out in any desired environment.

Initially, in operation 402, data associated with a sale of goods or services may be received. Optionally, the data may be received utilizing an input device. In operation 404, a plurality of values associated with the sale of goods or services may be calculated based on the received data. Such calculation may be accomplished utilizing a processor in communication with the input device.

Next, at least one of the values from operation 404 may be compared to a threshold, as shown in operation 406. Alternatively, the threshold may be altered based on the received data. Such alteration may include automatically altering the threshold based on predefined conditions. In this way, method 400 may adjust the threshold value if the comparison in operation 404 is continuously above or continuously below the threshold for a predefined period of time. This method 400 may optionally allow a seller to set the price of a good and/or service high or low without worrying about the effect on sales, since the price will automatically adjust itself accordingly.

For example, if during a predefined period of time the comparison of operation 404 continuously results in the value being less than the threshold, then the threshold may be automatically raised to a higher threshold, for example to the minimum in the predefined period (which is by definition higher than the former threshold). Similarly, if during a predefined period of time the comparison of operation 404 continuously results in the value being greater than the threshold, then the threshold may be automatically lowered to a lower threshold, for example to the maximum in the predefined period. In either case, the threshold may be automatically changed for an undefined period of time or for a predetermined period of time.

Again, the comparison of operation 406 may be done utilizing the same processor utilized in operation 404 or a different processor, as is desired. Furthermore, in operation 408, the price of the goods or services may be altered based on the comparison of operation 406, also using the same or different processor with respect to operations 404 and 406. Finally, the altered price may be output in operation 410. Optionally, the altered price may be output utilizing an output device that may further be in communication with the processor utilized in operation 406.

Figure 5:
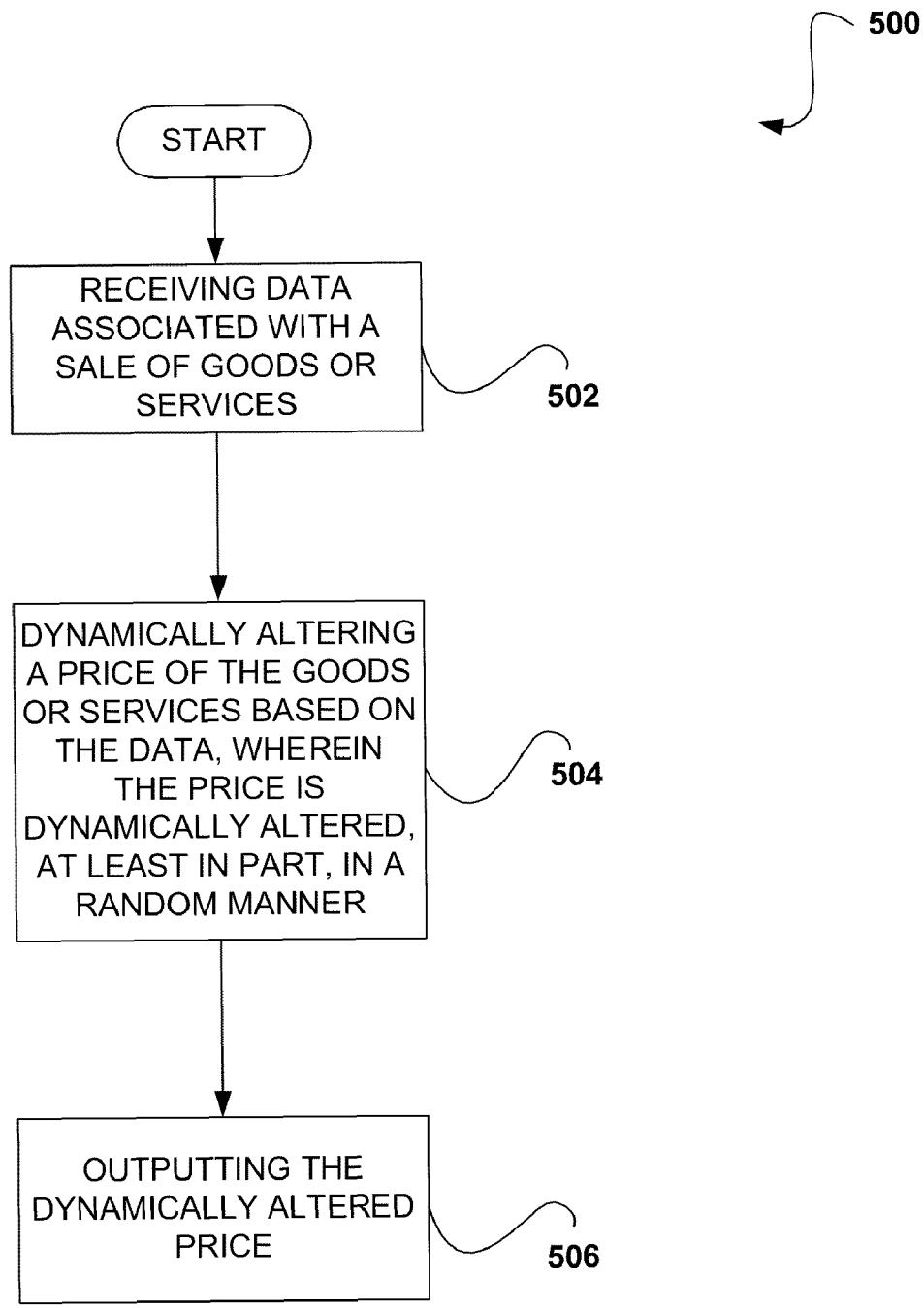
FIG. 5 shows a method for pricing, in accordance with yet another embodiment.

FIG. 5 shows a pricing method 500, in accordance with yet another embodiment. As an option, the method 500 may be implemented in the context of the architecture and environment of FIGS. 1-4 (with the same definitions applying herein). Of course, however, the method 500 may be carried out in any desired environment.

Initially, in method 500, data associated with a sale of goods or services is received, as shown in operation 502. Such data may be received utilizing an input device. Then, in operation 504, a price of the goods or services is altered based on the data received in operation 502. The price may optionally be altered, at least in part, in a random manner. In this manner, in one exemplary embodiment, goods and/or services may be sold at random prices which can optionally be used to identify an optimal price for future sales.

Additionally, in order to prevent certain buyers from being unfairly disadvantaged with respect to the randomized sale price they receive, method 500 may include charging a lower price to all buyers that decided to buy the good and/or service. Thus, even though a buyer may have decided to buy the good and/or service at one price, the buyer will ultimately only have to purchase the good and/or service at a specified lower price. The lower price may optionally be a minimum price in a price value range or any other price which is lower than the price that was presented to the buyer.

Alternatively, method 500 may include charging a lower, fixed price only to those buyers who decided to purchase the good and/or service at a price greater than the fixed price. Thus, such buyers need not be notified about the random manner in which the price is altered. Thus, this method allows for accurate data to be gathered for determining an accurate optimal price while still maintaining a fair price for all buyers. As an option, the price may be altered utilizing a processor in communication with the input device utilized in operation 502.

Finally, in operation 506 the altered price is output. Such output may be accomplished utilizing an output device in communication with the processor utilized in operation 504.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 6:
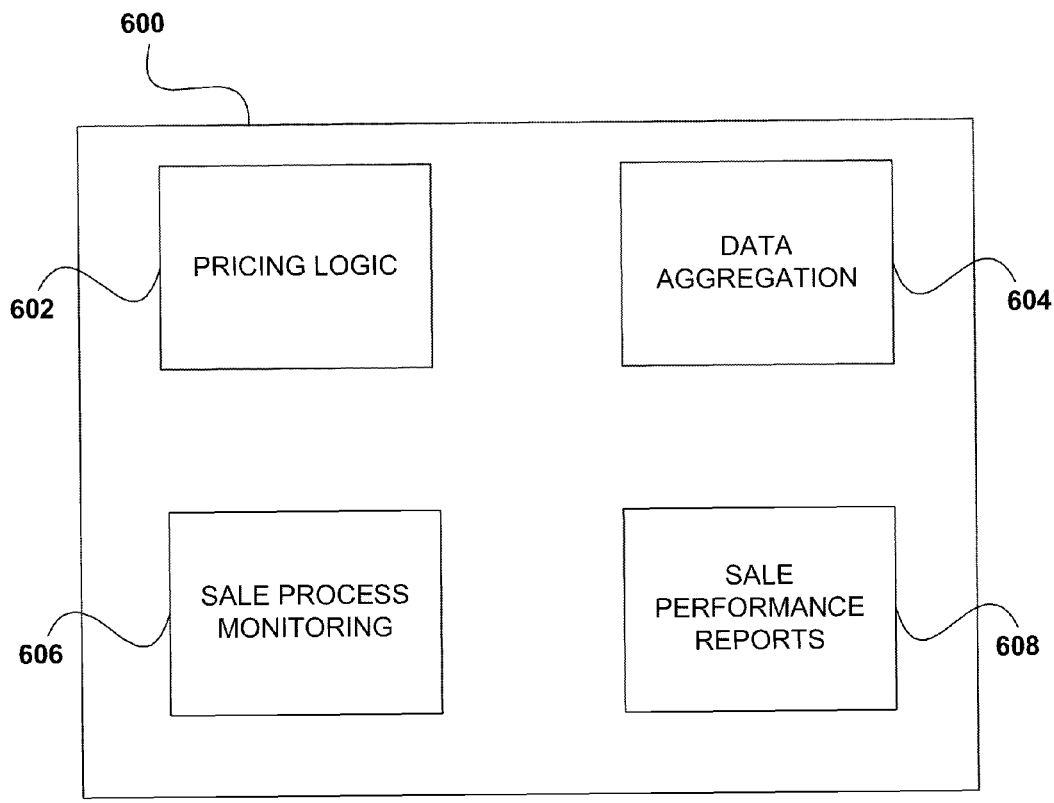
FIG. 6 shows a dynamic pricing platform, in accordance with one embodiment.

FIG. 6 shows a dynamic pricing platform 600, in accordance with one embodiment. As an option, the platform 600 may be implemented in the context of the architecture and environment of FIGS. 1-5. Of course, however, the platform 600 may be carried out in any desired environment.

Dynamic pricing platform 600 includes four modules: pricing logic 602, data aggregation 604, sale process monitoring 606, and sale performance reports 608. Of course, one of skill in the art will realize that the dynamic pricing platform 600 may include any number of modules capable of carrying out dynamic pricing.

Pricing logic module 602 includes logic required to dynamically alter a price, such as in operation 310 of FIG. 3, and logic required to output the dynamically altered price, such as in operation 312 of FIG. 3. Pricing logic module 602 may also include any additional logic necessary to carry forth any operations described with respect to FIGS. 3-5. Data aggregation module 604 allows purchase requests to be aggregated and stored. In addition, data aggregation module 604 provides a mechanism for other purchase details to be collected and stored, such as those with respect to operation 302 in FIG. 3, in order for them to be utilized in determining an optimal price. Data aggregation module may further aggregate and store any additional data desired for determining an optimal price.

Sale process monitoring module 606 obtains and tracks sales performance with respect to buyers' actions during sales for particular goods and/or services. Sale process monitoring module 606 uses such sales performance information in creating predefined reports. Sale process monitoring module 606 may also gather any additional information desired in order to track and report sales performance.

Sale performance reports module 608 provides a report of sale performance by a buyer after the buyer has purchased the good and/or service. Sale performance reports module 608 analyzes sale performance data and draws conclusions regarding the good and/or service sold along with the pricing logic that was applied to the sale. Of course sale performance reports module 608 is not limited to such performance data, but could be capable of also reporting on any other related data.

Figure 7:
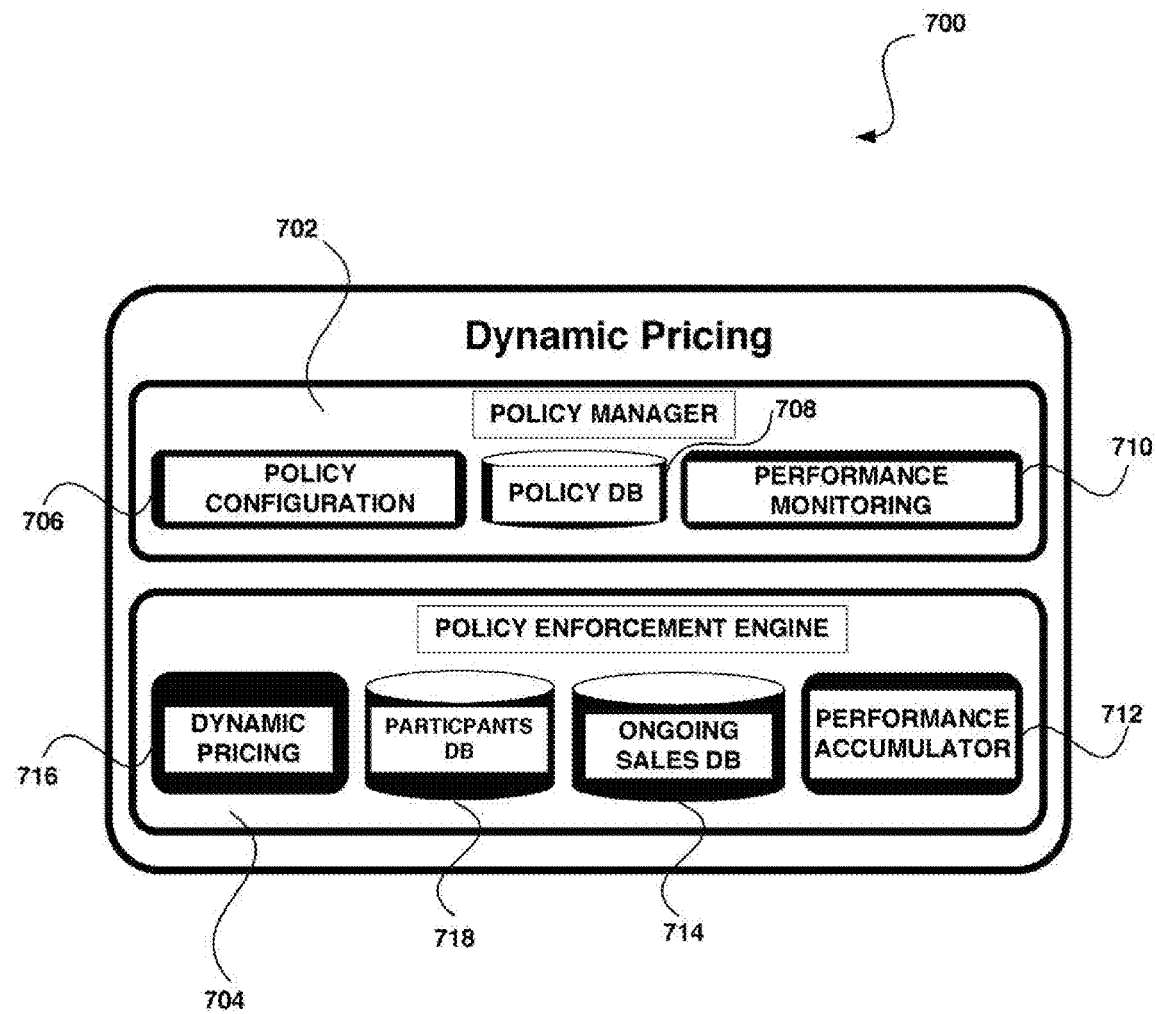
FIG. 7 shows a dynamic pricing architecture, in accordance with another embodiment.

FIG. 7 shows a dynamic pricing architecture 700, in accordance with one embodiment. As an option, the architecture 700 may be implemented in the context of the architecture and environment of FIGS. 1-6. Of course, however, the architecture 700 may be carried out in any desired environment.

The dynamic pricing architecture 700 includes a policy manager 702 and a policy enforcement engine 704. The policy manager 702 is responsible for dynamic pricing administration tasks and includes three components to carry forth such administration. First, the policy manager 702 includes a policy configuration component 706, which associates a good and or/service available for purchase with a predefined policy.

Such predefined policy may include any policy for dynamically altering a price of the good and/or service, and more specifically may include policies such as those utilized with respect to FIGS. 3-5. Additional specific policies that may be utilized will be described in further detail with respect to FIG. 9. By associating a predefined policy with a good and/or service, the dynamic pricing platform 600 of FIG. 6 can dynamically determine a price in response to a price request made by a buyer in accordance with an associated policy.

Second, the policy manager 702 includes a policy database 708 which stores the predefined policies utilized by the policy configuration component 706. Also included in the policy manager 702 is a performance monitor 710. The performance monitor 710 contains the logic and a set of reports for tracking the progress of sales. As an option, such performance monitor may include the modules described with respect to FIG. 6.

The policy enforcement engine 704 includes four components that cooperate to accumulate purchase requests and dynamically calculate the price of such requests. The first component included in the policy enforcement engine 704 is the performance accumulator 712. The performance accumulator 712 receives all price and purchase requests made by buyers and stores them in a performance database (not shown). The data in the performance database is then used for price calculation and for creating monitoring reports.

The next component included in the policy enforcement engine 704 is the ongoing sales database 714. The ongoing sales database 714 stores purchase requests of each good and/or service according to each associated policy.

Also included in the policy enforcement engine 704 is the dynamic purchase request component 716, which contains the logic for each policy. The dynamic purchase request component 716 is responsible for dynamically calculating a price for the good and/or service requested by a buyer according to policy logic. The dynamic purchase request component 716 also stores the dynamically calculated price in a participants database (which will be described in further detail with respect to element 718). In addition, the dynamic purchase request component 716 checks the validity of a price request given for a specific buyer such that it is determined whether a price should be recalculated or simply retrieved from a stored session of the particular buyer, and checks the validity of the price calculated, such that if the price is valid, the purchase is recorded in the ongoing sales database 714.

Finally, the policy enforcement engine 704 includes a participants database 718, which is utilized by the dynamic purchase request component 716 described above. The participants database 718 stores dynamically calculated prices associated with specific buyers. As an option, the stored price is utilized for a specified period of time with respect to that particular buyer. Thus, the buyer can purchase multiple goods and/or services of the same type for the same price within the specified period of time. In addition, when a purchase request is made by a buyer, the dynamic purchase request component 716 checks the validity of the price by using information stored in the participants database 718.

Of course, it should be noted that the dynamic pricing architecture 700 may include any additional components desired in order to carry forth operations related to dynamic pricing.

Figure 8A:
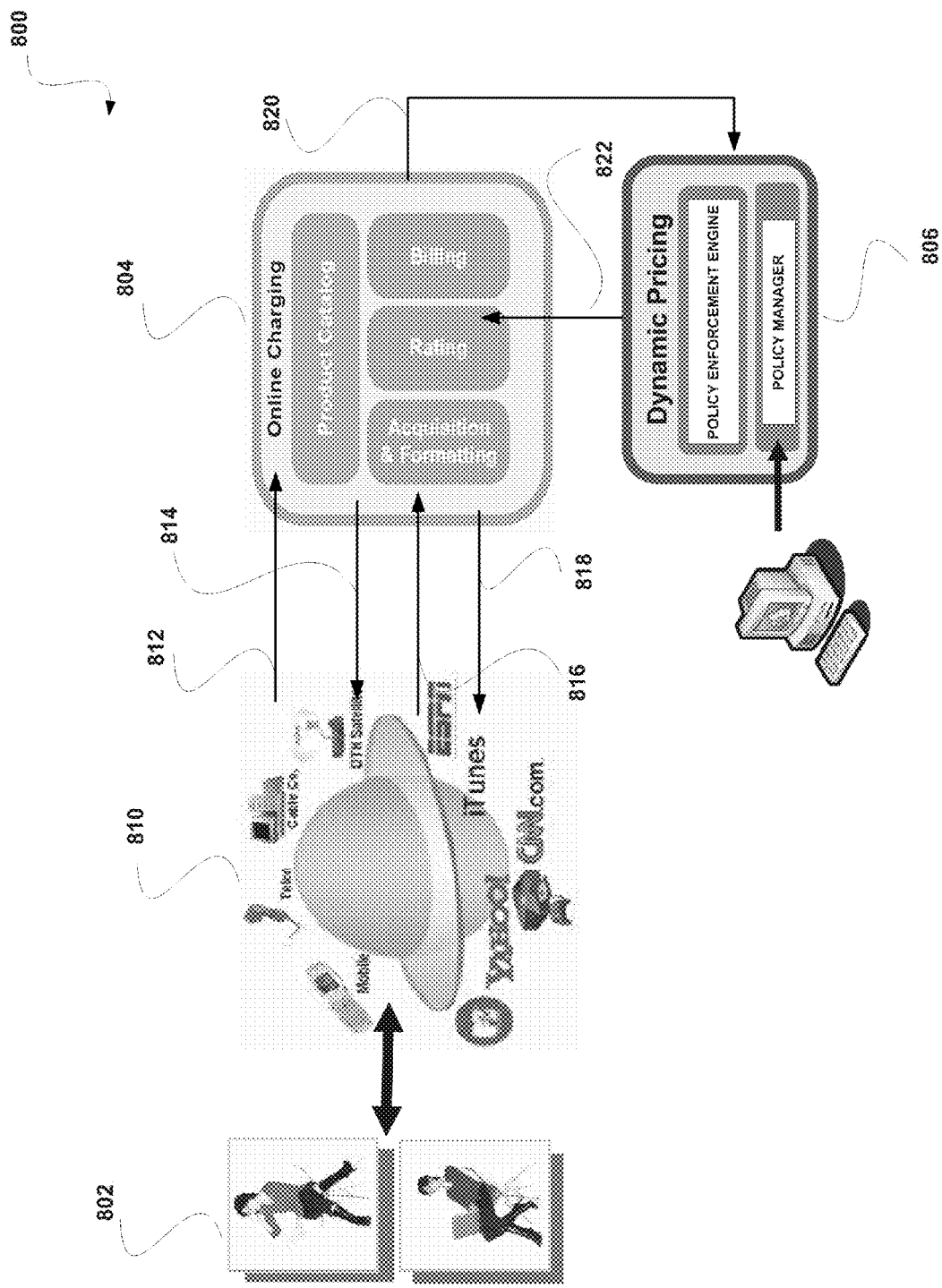
FIG. 8A shows the integration of dynamic pricing with a charging module, wherein the charging module is in communication with a dynamic pricing platform, in accordance with another embodiment.

FIG. 8A shows the integration of dynamic pricing with a charging module 800, wherein a dynamic pricing platform 806 pushes a price to the charging module 800, in accordance with yet another embodiment. As an option, the instant integration may be implemented in the context of the architecture and environment of FIGS. 1-7. Of course, however, such integration may be carried out in any desired environment.

In the present embodiment, the charging module 800 may include a charging component 804 that manages the charging of the sale of goods and/or services for sellers. In the present embodiment, the charging component 804 is one which catalogs goods and/or services, manages the acquisition of goods and/or services, formats the sale of goods and/or services, rates such sales and bills for such sales. One example of a charging component is Amdocs® Charging™ 6.

First, with respect to the present embodiment, a buyer 802 requests a price for a good and/or service. The request is sent through the service providing the good and/or service for sale, as shown in operation 810, and is then forwarded to the charging component 804, as shown in operation 812. The service providing the good and/or service for sale may include a mobile phone, a website, or any other service capable of selling a good and/or service.

Next, in operation 814, the price for the good and/or service is read from the product catalog of the charging component 804, as the price is received at the product catalog from the dynamic pricing platform 806. If the buyer 802 decides to purchase the good and/or service, the purchase request is sent to the charging component 804, as shown in operation 816 and purchase confirmation is subsequently sent to the buyer 802, as shown in operation 818.

At any time during or after the course of these operations, the dynamic pricing platform 806, in operation 820, is notified about the purchase and updates an ongoing sales database (not shown) with the purchase information, where such database may be the ongoing sales database as described with respect to element 714 of FIG. 7, for example. In addition, the dynamic pricing platform 806 may also update the price in the product catalog of the charging component 804, as shown in operation 822.

Figure 8B:
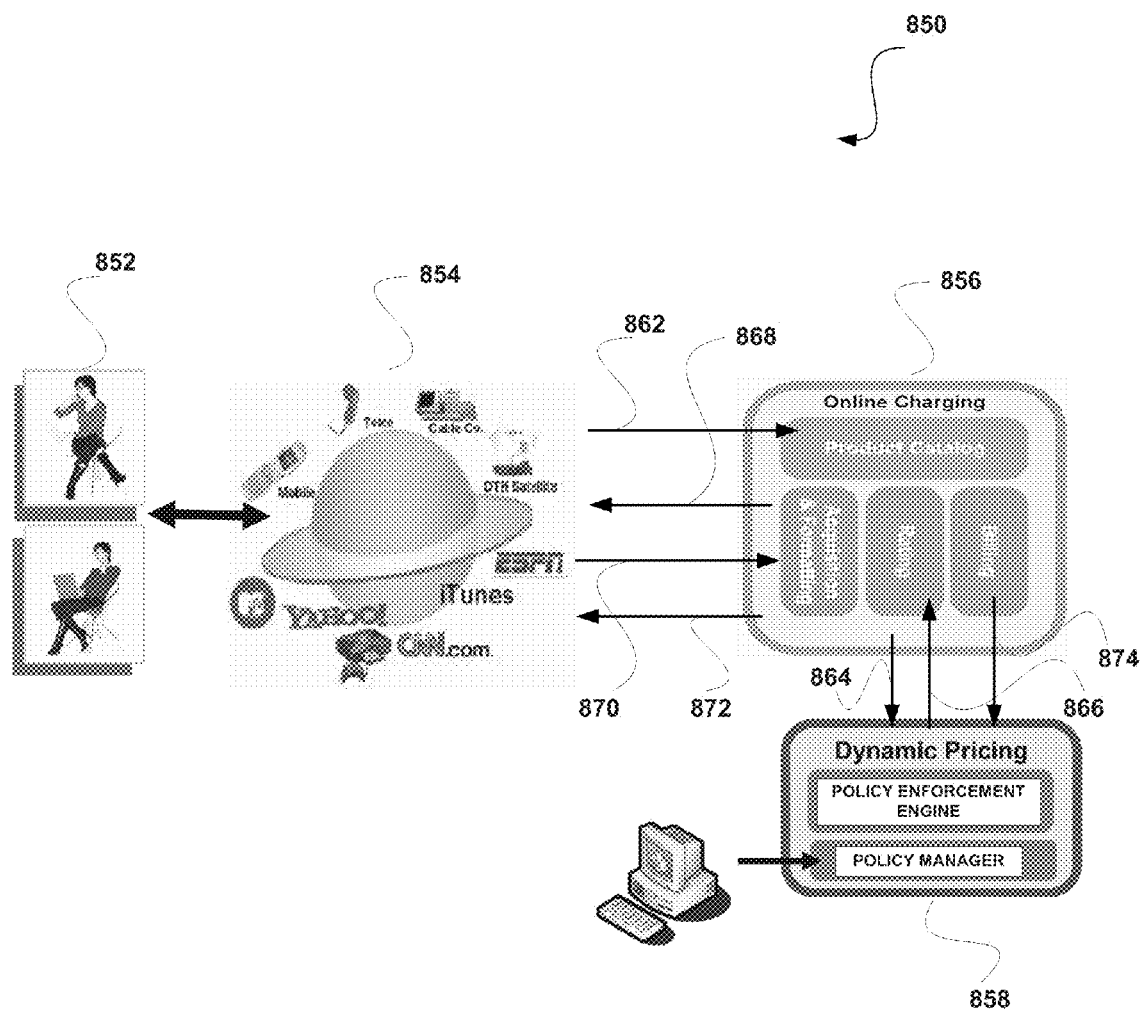
FIG. 8B shows the integration of dynamic pricing with a charging module, wherein a dynamic pricing platform pushes a price to the charging module, in accordance with yet another embodiment.

FIG. 8B shows the integration of dynamic pricing with a charging module 850, wherein the charging module is in communication with a dynamic pricing platform 858, such as that with respect to FIG. 6 for example, in accordance with another embodiment.

Initially, with respect to the present embodiment, a buyer 852 requests a price for a good and/or service through a service providing the good and/or service for sale, in operation 858. The price request is then forwarded to a charging component 856, as shown in operation 862. If the good and/or service is marked as participating in dynamic pricing, a price request is sent from the charging component 856 to the dynamic pricing platform 858, as shown in operation 864. The price is then calculated by the dynamic pricing platform 858 and sent to the charging component 856, as shown in operation 866.

Also in operation 866, the dynamic pricing platform 858 may update a participants database (not shown). As an option, the participants database may be the participants database as described with respect to element 718 of FIG. 7. The price is then sent to the buyer 852, as shown in operation 868. If the buyer 852 decides to purchase the good and/or service, the purchase request is sent to the charging component 856, as in operation 870. In operation 872, a purchase confirmation is sent to the buyer 852. Further, the dynamic pricing platform 858 is notified about the buyer's purchase and consequently updates an ongoing sales database.

While various architectures have been set forth in the context of FIGS. 8A and 8B, it should be noted that various other architectures are also envisioned. For example, a similar embodiment utilizing the Amdocs® Commerce Broker™ is further envisioned, as one of many optional embodiments.

Figure 9:
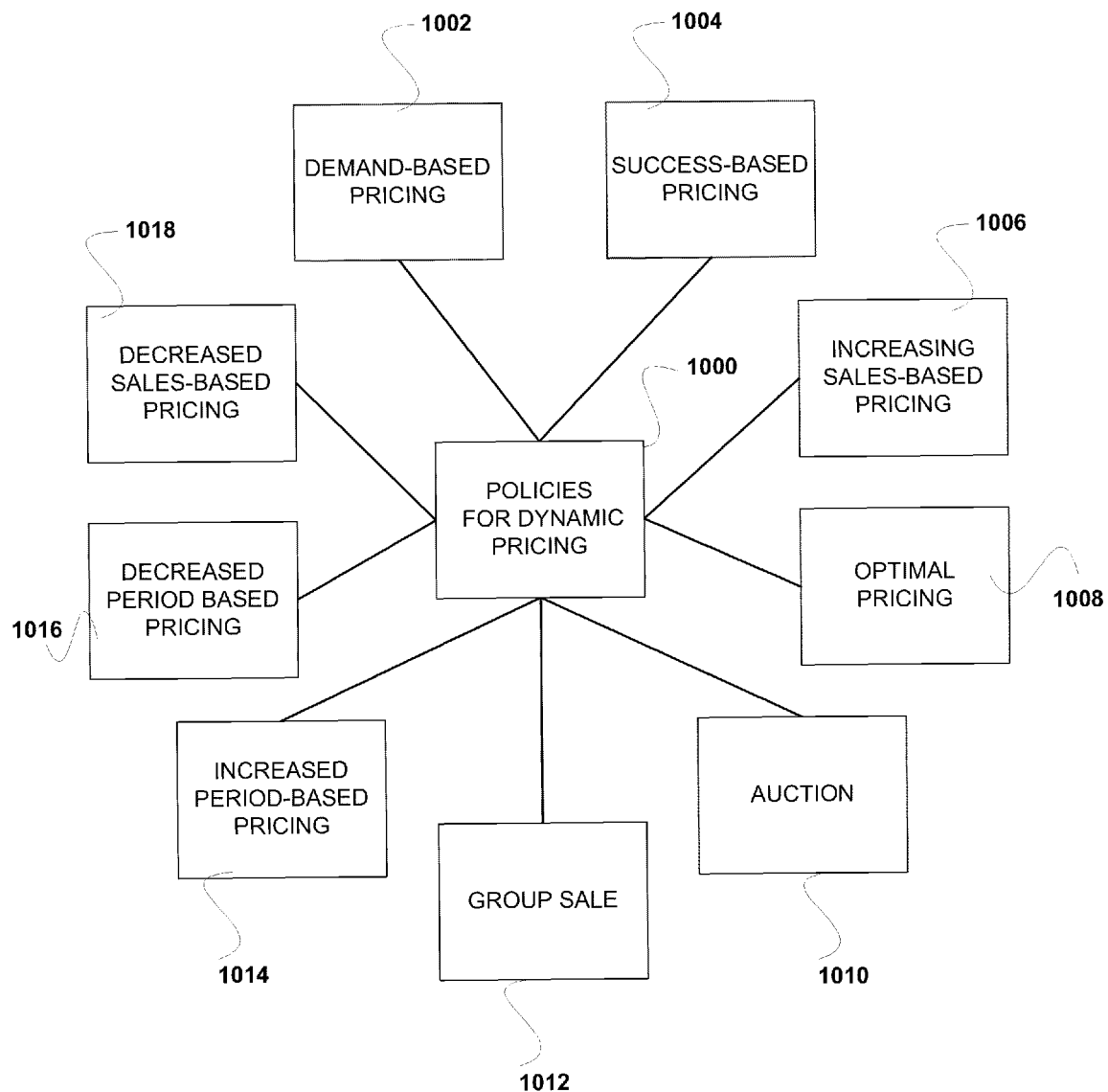
FIG. 9 shows policies that may be utilized in dynamic pricing, in accordance with still yet another embodiment.

FIG. 9 shows policies 1000 that may be utilized in dynamic pricing, in accordance with yet another embodiment. As an option, the policies 1000 may be implemented in the context of the architecture and environment of FIGS. 1-8. Of course, however, the policies 1000 may be carried out in any desired environment.

A first policy that may be utilized in dynamic pricing is demand-based pricing 1002. In demand based pricing 1002, the policy is defined as increasing or decreasing the price of an good and/or service if the demand for the good and/or service by buyers is respectively above or below a predefined threshold. This type of policy allows for identifying a close-to-optimal price, especially in situations with low price elasticity. Table 2 provides information that is configured in demand based pricing, for example.

TABLE 2

Initial service price and minimum price
Expected purchasing rate/demand
How often the demand will be monitored
The reference period for monitoring the demand
The price increment when sales are above threshold
The price decrement when sales are below threshold

TABLE 2-continued

Whether threshold is:
    updated if actual demand exceeds a certain percentage, or
    Remains unchanged during a sale period A second policy that may be utilized in dynamic pricing is success based pricing 1004. Success based pricing 1004 is utilized in the same way as demand based pricing 1002 except the demand threshold is set to be the ratio between the number of purchases and the number of price requests instead of a simple demand value. This type of policy avoids changing the price in situations where the number of purchases is very low due to low interest (e.g. during the night).

A third policy that may be utilized in dynamic pricing is increasing sales based pricing 1006. In increasing sales based pricing 1006, the good and/or service price increases for each predefined period of time if the number of sales during such period of time reaches a certain threshold. This type of policy encourages buyers to buy quickly in order to receive the lowest possible price. Table 3 provides information that is configured in increasing sales based pricing, for example.

TABLE 3

Initial service price and maximum price
Sales threshold
How often the demand will be monitored
The reference period for monitoring the demand
The price increment when sales exceed the threshold A fourth policy that may be utilized in dynamic pricing is optimal pricing 1008. In optimal pricing 1008, goods and/or services are sold at random prices. The random prices are distributed uniformly throughout selected groups of buyers. Further, during a specified sale time period, the price is fixed for each buyer and the price does not expire. This type of policy is capable of identifying an optimal price for future regular sales. Table 4 provides information that is configured in optimal pricing, for example.

TABLE 4

Price range and increments
Policy duration

A fifth policy that may be utilized in dynamic pricing is an auction sale 1010. In an auction sale 1010, goods and/or services are sold to the highest bidder. This type of policy allows maximum prices to be paid and also allows for a seller to gain information about the real value of the good and/or service. Table 5 provides information that is configured in auction sales, for example.

TABLE 5

The auction opening time
The product's base price
The incremental price between bids
The duration of the auction
The increment time after the last bid A sixth policy that may be utilized in dynamic pricing is group sales 1012. In group sales 1012, a limited number of goods and/or services are offered for sale as a group, and the price that is set for the goods and/or services is only valid if the entire group of goods and/or services is sold. In this policy, additional goods may optionally be offered for sale as separate groups during the sale period. This type of policy gives a buyer a lower price while guaranteeing that the entire quantity of goods and/or services within a group will sell.

A seventh policy that may be utilized in dynamic pricing is increased period based pricing 1014. In increase period based pricing 1014, the price is updated periodically, at predefined increments. At any given moment the price is uniform with respect to all buyers. This type of policy encourages buyers to purchase the good and/or service quickly in order to get the lowest price. Table 6 provides information that is configured in period based pricing, for example.

TABLE 6

Initial price, Maximum price
Duration
Price increment
Time periods for price update An eighth policy that may be utilized in dynamic pricing is decreased period based pricing 1016. Decreased period based pricing 1016 updates a price for a good and/or service periodically, at predefined decrements. At any given moment, the price is uniform with respect to all buyers. This type of policy is effective for goods and/or services that are in high demand. Furthermore, this policy encourages buyers to purchase the good and/or service quickly in order to make sure they do not lose out on the price. Table 7 provides information that is defined in decreased period based pricing, for example.

TABLE 7

Initial price, Minimum price
Duration
Price decrement
Time periods for price update A ninth policy that may be utilized in dynamic pricing is decreased sales based pricing 1018. In decreased sales based pricing 1018, the price of a good and/or service decreases as sales for the good and/or service increase. In this policy, the price can terminate at any time, for example after a predefined time period or a predefined amount of goods and/or services have been sold. This type of policy encourages buyers to quickly purchase, even at high prices, before stock of the good and/or service runs out. Table 8 provides information that is defined in decreased sales based pricing, for example.

TABLE 8

Initial price, Minimum price
Duration
Price Decrement
Time periods for price update
Sales threshold within time period for the decision of price update A tenth policy that may be utilized in dynamic pricing is demand-based pricing with a modifiable threshold (not shown). This policy is similar to demand-based pricing in that the policy is defined as increasing or decreasing the price of a good and/or service if the demand for the good and/or service by buyers is respectively above or below a predefined threshold. However, the present policy differs from the general demand-based pricing in that it allows for a threshold that may be modified, which may guarantee stabilization of the price over time. For example, if the general demand-based policy has an upper threshold which is too low, the price will permanently increase. With a modifiable threshold, the price can be stopped from permanently increasing by adjusting the threshold. Table 9 provides information that is configured in demand-based pricing with a modifiable threshold, for example.

TABLE 9

Initial service price and minimum price
Expected purchasing rate/demand
How often the demand will be monitored
The reference period for monitoring the demand
The price increment when sales are above threshold
The price decrement when sales are below threshold
Whether threshold is:
    updated if actual demand exceeds a certain percentage, or
    remains unchanged during a sale period
Whether and/or when threshold should be modified An eleventh policy that may be utilized in dynamic pricing is success-based pricing with a modifiable threshold (not shown). Success-based pricing with a modifiable threshold is utilized in the same way as demand-based pricing with a modifiable threshold except the threshold is not set, but may be modified. This type of policy guarantees stabilization of the price over time.

Of course, the present policies 1000 are not limited to the policies described, but may also include any other policies (e.g., demand-based with modifiable threshold, success-based with modifiable threshold, etc.) that may be used alone, or in combination with any of the above described policies. Furthermore, the policies 1000 may include additional or leave out any of the parameters configured for each policy, in accordance with the requirements of the particular policy.

Figure 10:
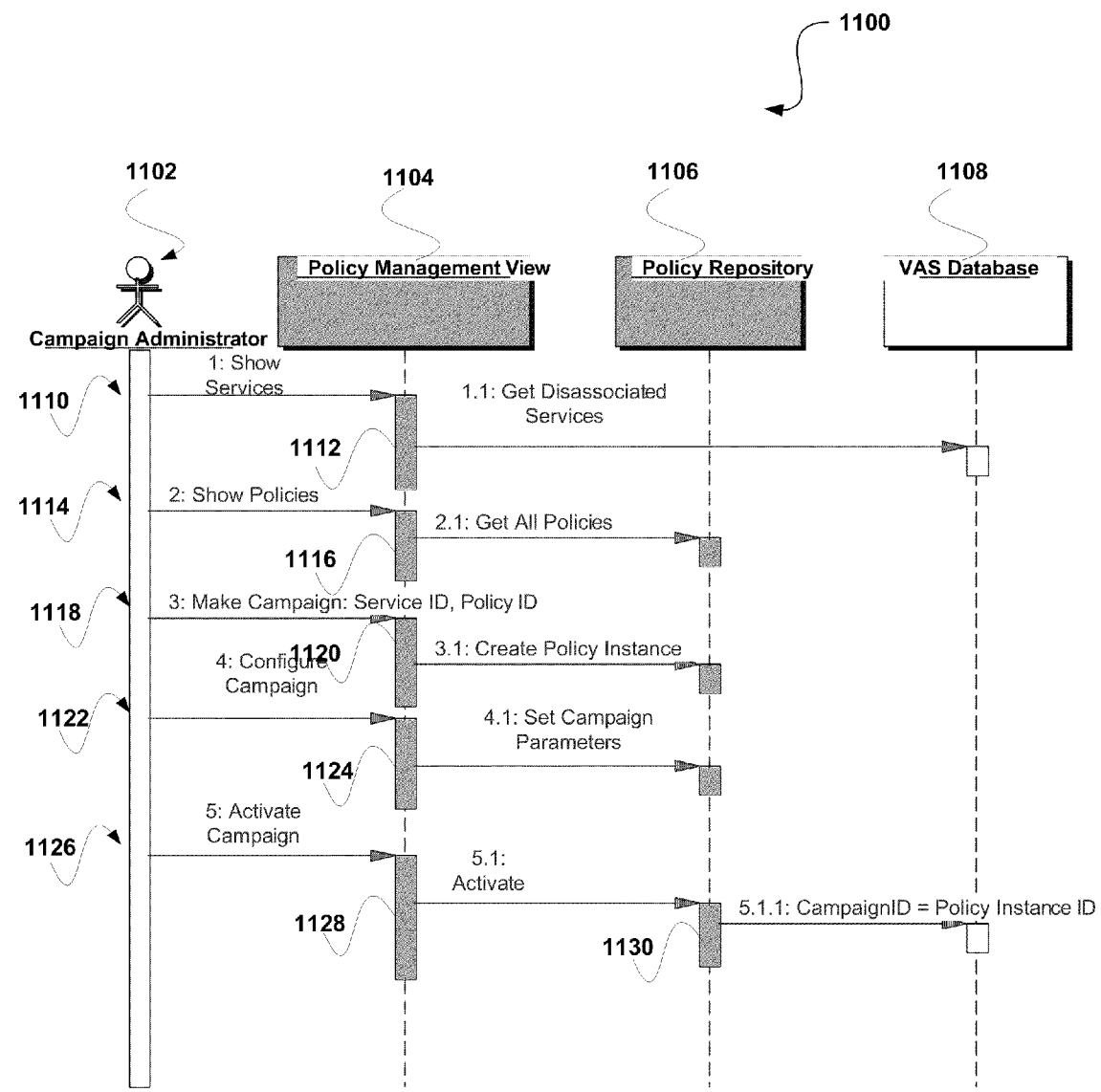
FIG. 10 shows a method for creating a policy for use in a dynamic pricing scheme, in accordance with even still yet another embodiment.

FIG. 10 shows a method 1100 for creating a policy for use in a dynamic pricing scheme, in accordance with still yet another embodiment. As an option, the method 1100 may be implemented in the context of the architecture and environment of FIGS. 1-9. Of course, however, the policies 1100 may be carried out in any desired environment.

Initially, method 1100 begins by an administrator 1102 requesting to see all goods and/or services that are provided to buyers, as shown in operation 1110. A policy management view 1104 then displays all disassociated, and optionally associated (i.e. a combination of services in cases where the time periods for each service overlap, a sequential definition of policies according to each service, etc.), goods and/or services that were retrieved from a database 1108 along with their associated good and/or service identifications, as shown in operation 1112. Next, in operation 1114, the administrator 1102 requests for all policies to be displayed. The policy management view 1104 then displays all policies that have been retrieved from a policy repository 1106, as shown in operation 1116.

In operation 1118, the administrator 1102 requests to create a policy and enters a good and/or service identification and policy identification to associate the new policy with a good and/or service that is to be sold. A new policy instance is created in the policy repository 1106, as in operation 1120. The administrator 1102 is then free to configure the policy, as in operation 1122. At this time, policy parameters may be set by the administrator 1102 and stored in the policy repository 1106 for the specific policy, as depicted in operation 1124.

Finally, the administrator 1102 may choose to activate the policy, as in operation 1126. The policy is then marked as activated in the policy repository 1106, as shown in operation 1128, and a policy identification is assigned to the instance of the policy in the database 1108. Note operation 1130.

Figure 11:
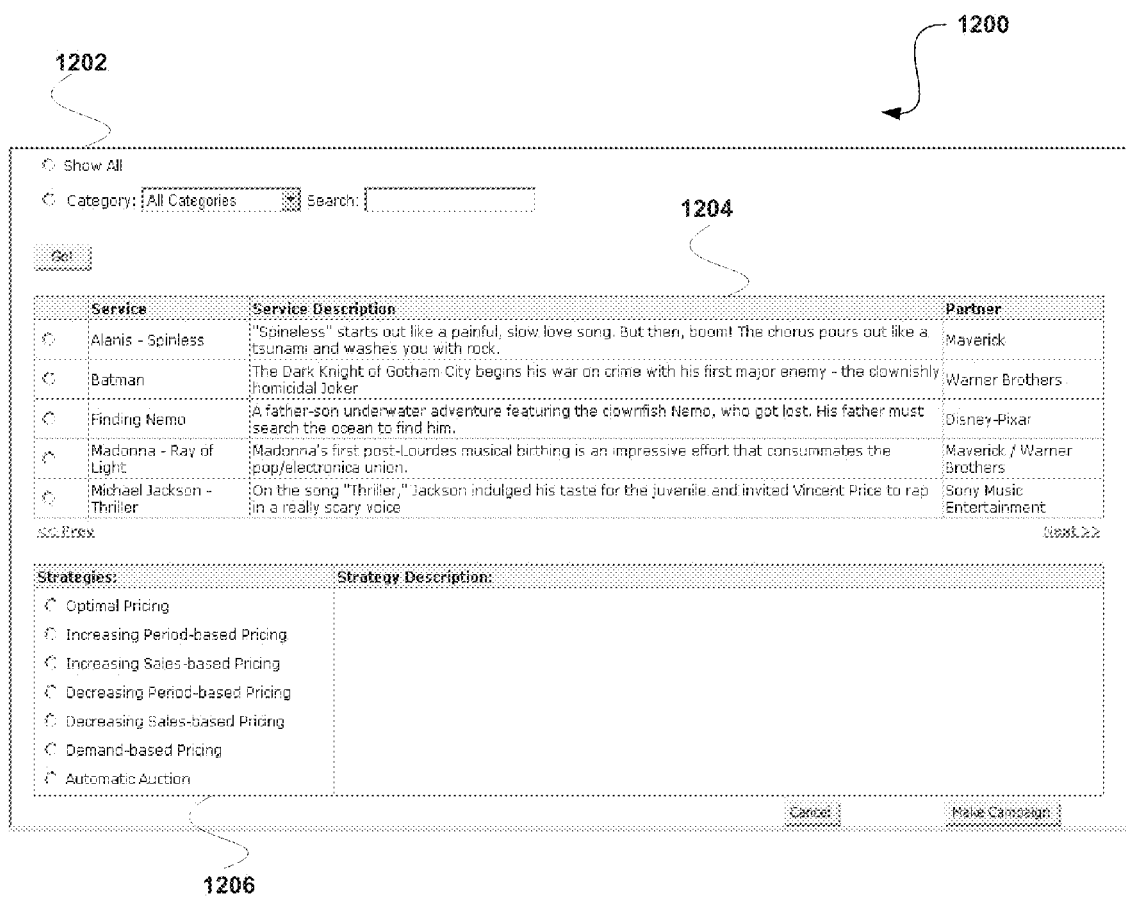
FIG. 11 shows a display of a graphical user interface (GUI) for creating a new policy, in accordance with one embodiment.

FIG. 11 shows a display 1200 of a graphical user interface (GUI) for creating a new policy, in accordance with another embodiment. As an option, the display 1200 may be implemented in the context of the architecture and environment of FIGS. 1-10. Of course, however, the display 1200 may be carried out in any desired environment.

Display 1200 includes an option 1202 of whether to show all goods and/or services available for sale or only a category of such goods and/or services. See, for example, operation 1110 of FIG. 10. Further included is a first list 1204 of all goods and/or services chosen for display along with a description and partner (seller) of each good and/or service. Each listed good and/or service is also capable of being chosen by a user. Additionally, the display 1200 includes a second list 1206 of all of the available policies for each good and/or service listed, and the ability to choose one such option. The display 1200 also includes a section for entering a policy description for the policy chosen.

Figure 12:
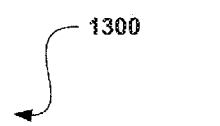
FIG. 12 shows a display of a GUI for configuring a policy, in accordance with another embodiment.

FIG. 12 shows a display 1300 of a GUI for configuring a policy, in accordance with yet another embodiment. As an option, the display 1300 may be implemented in the context of the architecture and environment of FIGS. 1-11. Of course, however, the display 1300 may be carried out in any desired environment.

The display 1300 includes a GUI that allows a user to enter parameters for a specified policy. For example, see operation 1122 of FIG. 10. Such parameters may include a period, price, sales expectation, price update and time period the price is valid. Of course, any other combination of parameters may be utilized in the configuration GUI according to each specific policy.

Figure 13:
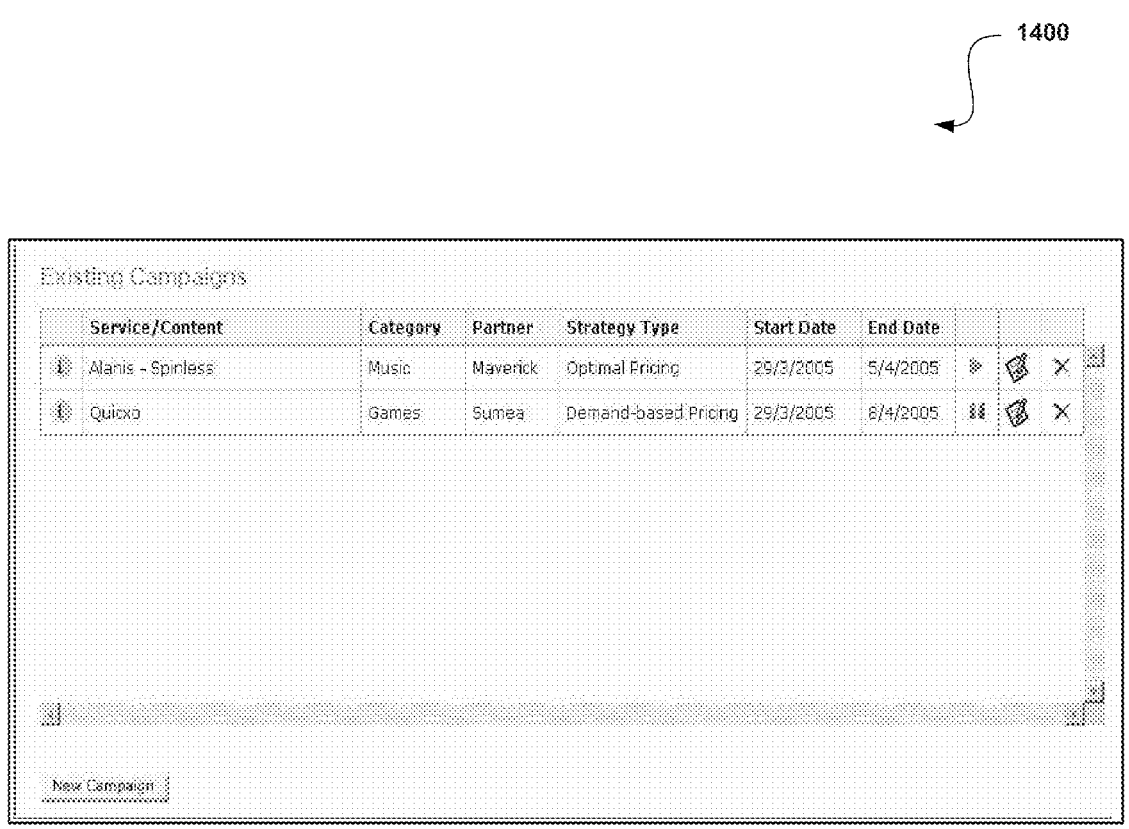
FIG. 13 shows a GUI display of existing policies, in accordance with yet another embodiment.

FIG. 13 shows a GUI display 1400 of existing policies, in accordance with yet another embodiment. As an option, the display 1400 may be implemented in the context of the architecture and environment of FIGS. 1-12. Of course, however, the display 1400 may be carried out in any desired environment.

Figure 14:
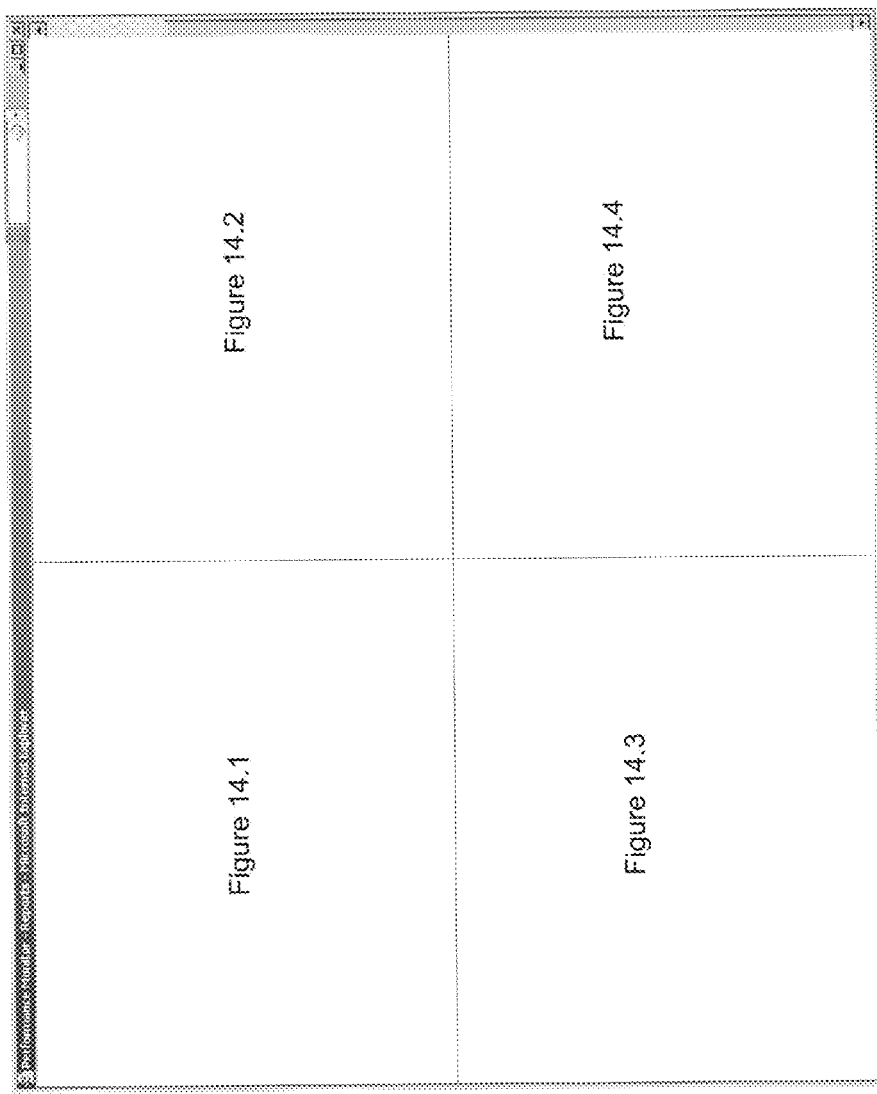
FIGS. 14 and 14A each shows a display of a performance monitor, in accordance with still yet another embodiment.
Figure 14A:
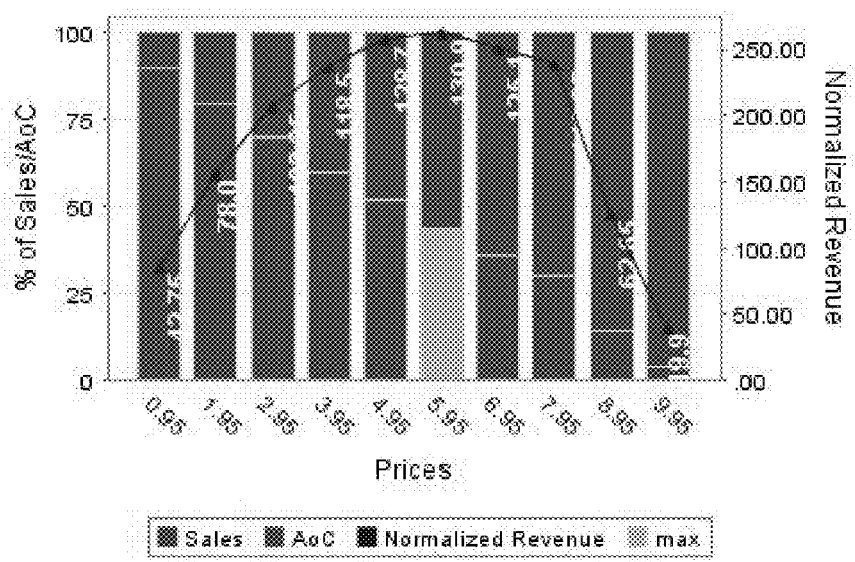

FIGS. 14-14A show displays 1500 and 1502 of a performance monitor, in accordance with still yet another embodiment. As an option, the displays 1500 and 1502 may be implemented in the context of the architecture and environment of FIGS. 1-13. Of course, however, the displays 1500 and 1502 may be carried out in any desired environment.

The display 1500 displays reports that track the progress of each policy. For example, a Sales and Normalized Revenue Per Price chart reflects a normalized revenue per price. In the present example, such revenue is normalized by scaling the number of price requests to 100. Of course, such revenue may be normalized and displayed in any desired manner. Such display 1500 may depict the reports described with respect to the performance monitor 710 of FIG. 7, although they may also be based on the tracked results of any performance monitor. The display 1502 displays a sales and normalized revenue per price. For example, such display 1502 is capable of displaying all prices for a given pricing policy, for providing information on the highest revenues.

The displays shown in FIGS. 11-14A are for illustration only, and are not to be construed as limiting in any way. Any types of displays that are capable of carrying forth the operations described hereinabove are also contemplated.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. A method, comprising:
    receiving data associated with a sale of goods or services, utilizing an input device;
    calculating a plurality of values associated with the sale of goods or services based on the received data, utilizing a processor in communication with the input device;

comparing at least one of the values to a first low threshold, utilizing the processor;
comparing at least one of the values to a second high threshold, utilizing the processor;
determining a price of the goods or services based on the comparisons, utilizing the processor; and
outputting the determined price, utilizing an output device in communication with the processor;
wherein the data associated with the sale of goods or services is received in response to a price request for the goods or services by a buyer;
wherein the price of the goods or services is an optimal price determined in real-time, such that the price of the goods or services is attributed to the sale of the goods or services and reflects a current optimal price that is optimal at the time of the determination of the price of the goods or services and in which maximum revenues are capable of being realized based on the values associated with the sale of goods or services.

2. The method of claim 1, wherein the data includes a number of buyers that have requested a price for the goods or services.

3. The method of claim 1, wherein the data includes a number of goods or services purchased within a predefined time period.

4. The method of claim 1, wherein the data includes a time period between the price request for the goods or services by the buyer and an actual purchase of the goods or services by the buyer.

5. The method of claim 1, wherein the plurality of values that are calculated include a ratio between a number of goods or services purchased and a number of price requests made for the goods or services within a predefined time period.

6. The method of claim 1, wherein the plurality of values that are calculated include a sum of goods or services sold within a predefined time period.

7. The method of claim 1, wherein the price of the goods or services is determined according to a first rule if at least one calculated value is less than the first low threshold.

8. The method of claim 7, wherein the first rule includes decreasing the price of the goods or services by a predetermined amount.

9. The method of claim 7, wherein the price of the goods or services is determined according to a second rule if at least one calculated value is greater than the first low threshold and less than the second high threshold.

10. The method of claim 9, wherein the determining includes altering and the second rule includes not altering the price of the goods or services.

11. The method of claim 9, wherein the price of the goods or services is determined according to a third rule if at least one calculated value is greater than the second high threshold.

12. The method of claim 11, wherein the determining includes altering and the third rule includes increasing the price of the goods or services by a predetermined amount.

13. A computer program product embodied on a non-transitory computer readable medium, comprising:
computer code for receiving data associated with a sale of goods or services;
computer code for calculating a plurality of values associated with the sale of goods or services based on the received data;
computer code for comparing at least one of the values to a first low threshold;
computer code for comparing at least one of the values to a second high threshold;
computer code for determining a price of the goods or services based on the comparisons; and
computer code for outputting the determined price;
wherein the computer program product is operable such that the data associated with the sale of goods or services is received in response to a price request for the goods or services by a buyer;
wherein the computer program product is operable such that the price of the goods or services is an optimal price determined in real-time, such that the price of the goods or services is attributed to the sale of the goods or services and reflects a current optimal price that is optimal at the time of the determination of the price of the goods or services and in which maximum revenues are capable of being realized based on the values associated with the sale of goods or services.

14. A system, comprising:
a processor for:
receiving data associated with a sale of goods or services, utilizing an input device;
calculating a plurality of values associated with the sale of goods or services based on the received data;
comparing at least one of the values to a first low threshold;
comparing at least one of the values to a second high threshold;
determining a price of the goods or services based on the comparisons; and
outputting the determined price;
wherein the system is operable such that the data associated with the sale of goods or services is received in response to a price request for the goods or services by a buyer;
wherein the system is operable such that the price of the goods or services is an optimal price determined in real-time, such that the price of the goods or services is attributed to the sale of the goods or services and reflects a current optimal price that is optimal at the time of the determination of the price of the goods or services and in which maximum revenues are capable of being realized based on the values associated with the sale of goods or services.

15. The method of claim 1, wherein the first low threshold and the second high threshold each include a random value.

16. The method of claim 1, further comprising charging the buyer a price lower than the determined price if the buyer agrees to purchase the goods or services at the determined price.

17. The method of claim 1, further comprising charging the buyer a price lower than the determined price if the buyer agrees to purchase the goods or services when the determined price is greater than a predetermined price.

18. The method of claim 1, wherein the price of the goods or services is determined according to a policy associated with environmental changes.

19. The method of claim 1, wherein the data includes a number of goods and/or services purchased for a specific type.

20. The method of claim 1, wherein the data includes an amount of time passed since a last purchase for the goods or services.

* * * * *